(12) United States Patent
Bond

(10) Patent No.: US 7,152,463 B2
(45) Date of Patent: Dec. 26, 2006

(54) VEHICLE SECURING MECHANISM FOR A DYNAMOMETER

(75) Inventor: Neville J Bond, Gisborne (AU)

(73) Assignee: Drag Tag Pty Ltd, Victoria (AU)

( * ) Notice: Subject to any disclaimer, the term of this patent is extended or adjusted under 35 U.S.C. 154(b) by 0 days.

(21) Appl. No.: 11/212,104

(22) Filed: Aug. 26, 2005

(65) Prior Publication Data

US 2006/0042365 A1    Mar. 2, 2006

Related U.S. Application Data

(63) Continuation of application No. PCT/AU2005/000132, filed on Feb. 2, 2005.

(30) Foreign Application Priority Data

Feb. 3, 2004    (AU) .............................. 2004900513

(51) Int. Cl.
*G01L 3/02* (2006.01)
(52) U.S. Cl. ..................................................... 73/117
(58) Field of Classification Search .................. 73/116, 73/117, 117.2, 117.3, 118.1, 119 R, 862, 73/862.01, 862.041, 862.042, 862.043, 862.05
See application file for complete search history.

(56) References Cited

U.S. PATENT DOCUMENTS

| | | | |
|---|---|---|---|
| 2,036,653 A | 4/1936 | Starr | |
| 3,849,908 A | 11/1974 | Sturgeon | |
| 3,861,064 A | 1/1975 | Sturgeon et al. | |
| 4,455,866 A | 6/1984 | Barrigar | |
| 5,111,685 A * | 5/1992 | Langer | 73/117 |
| 5,277,060 A * | 1/1994 | Lehman et al. | 73/117 |
| 5,756,889 A * | 5/1998 | D'Angelo | 73/117 |
| 6,457,352 B1 * | 10/2002 | Knestel | 73/117 |
| 6,505,503 B1 * | 1/2003 | Teresi et al. | 73/117 |
| 6,561,013 B1 * | 5/2003 | Leep | 73/117 |
| 2003/0079529 A1 * | 5/2003 | Leep | 73/117 |

OTHER PUBLICATIONS

International Search Report of International Application PCT/AU2005/000132 Filed Feb. 2, 2005.

* cited by examiner

Primary Examiner—Eric S. McCall
(74) Attorney, Agent, or Firm—Pillsbury Winthrop Shaw Pittman LLP

(57) ABSTRACT

A securing mechanism for attachment to a chassis dynamometer for securing a motor vehicle on the chassis dynamometer, the securing mechanism including a vehicle engaging component which, when the securing mechanism is attached to the chassis dynamometer, is engageable with a vehicle on the dynamometer to thereby secure the vehicle to ensure it remains substantially stationary on the dynamometer, at least one actuator and a load beam for moving the vehicle engaging component in three orthogonal directions and into engagement with the vehicle for securing the vehicle wherein the actuator is for use with a remotely operable control system. The vehicle engaging component may be a pin for engaging hook shaped bracket that is fixed to the vehicle's axle housing of the vehicle.

18 Claims, 4 Drawing Sheets

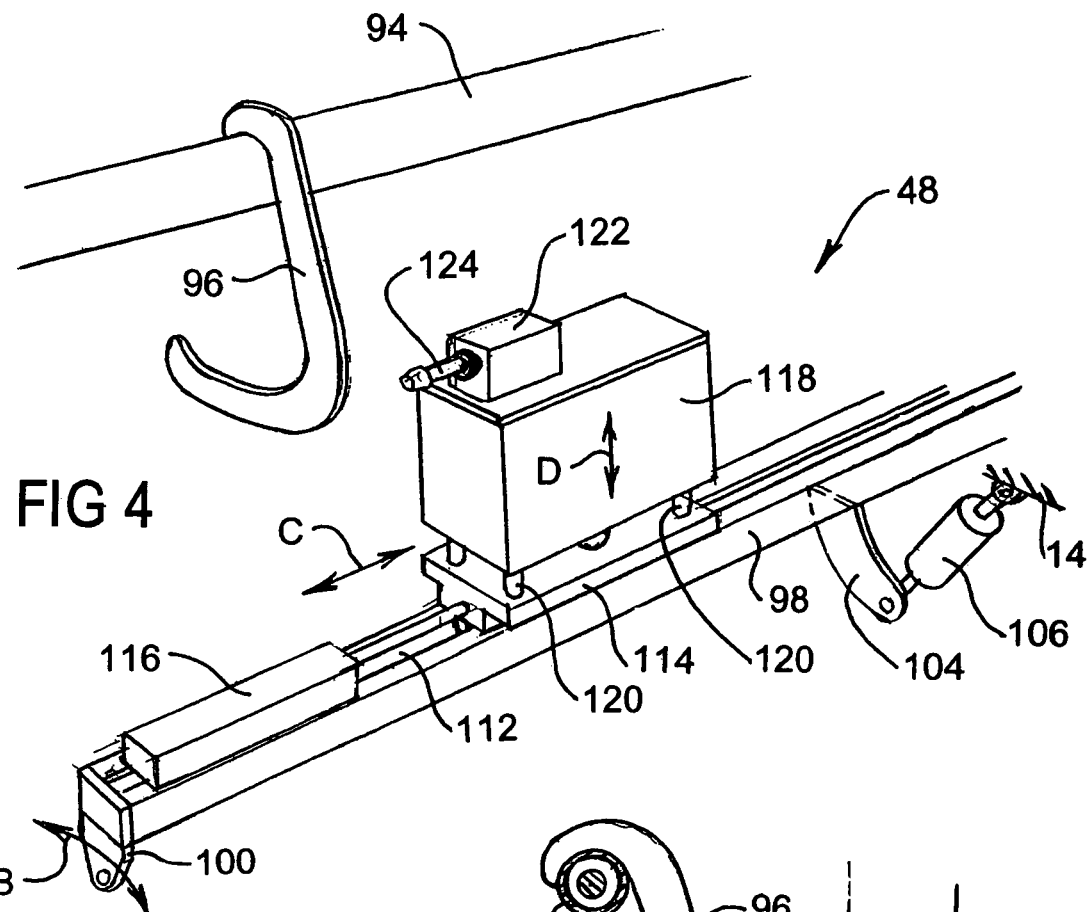
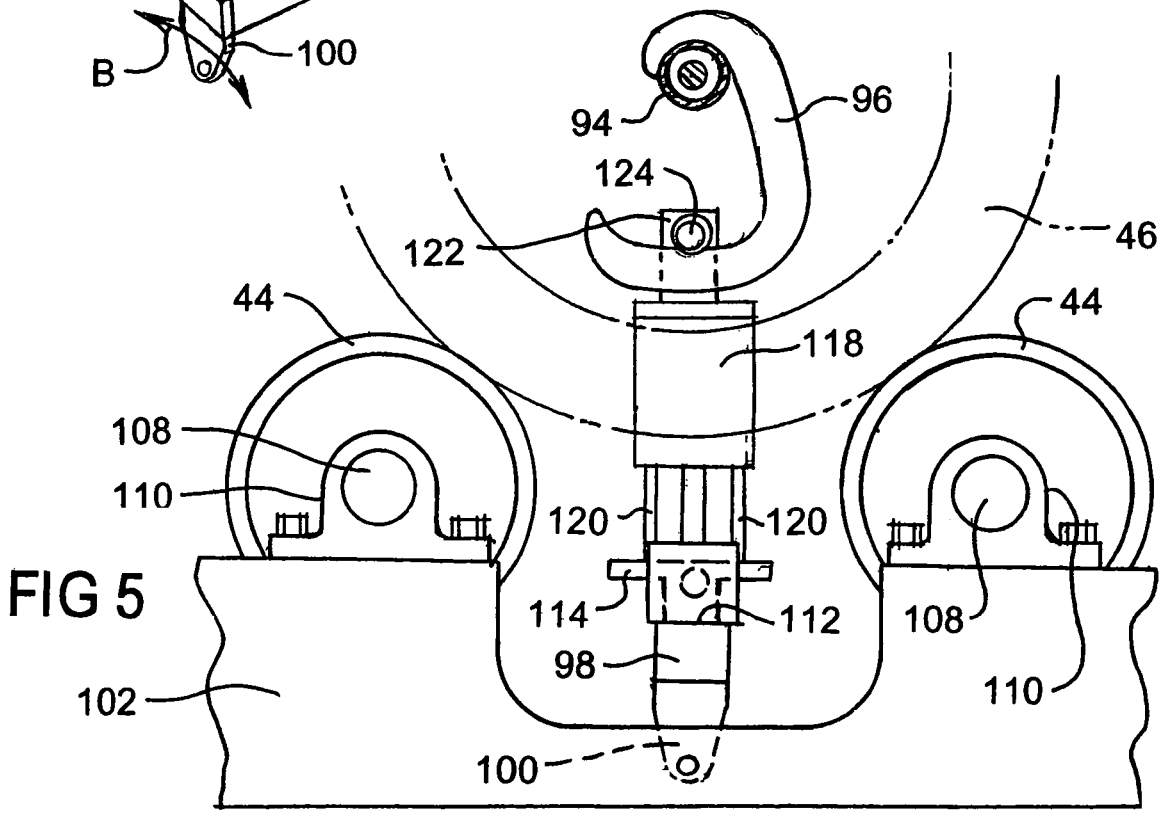

VEHICLE SECURING MECHANISM FOR A DYNAMOMETER

CROSS REFERENCE TO RELATED APPLICATIONS

This is a Continuation of PCT/AU2005/000132, filed Feb. 2, 2005, which relies for priority on Australian Patent Application No. 2004900513, filed Feb. 3, 2004, both of which are incorporated herein by reference in their entireties.

TECHNICAL FIELD

The present invention relates to a securing mechanism for attachment to a chassis dynamometer for securing a motor vehicle on the dynamometer. The invention also relates to apparatus that includes a chassis dynamometer for testing or simulated driving of a motor vehicle that includes the securing mechanism. The invention furthermore relates to a bracket for attachment to a vehicle for use with the securing mechanism.

BACKGROUND

Chassis dynamometers are used to measure various performance parameters of motor vehicles from which diagnoses can be made of possible engine, drive train or suspension faults in the vehicle. A chassis dynamometer may also be a component in apparatus for simulated driving of a motor vehicle, for example for driver training or simulated racing as disclosed in the applicant's co-pending International application No. PCT/AU2005/000131 (WO 2005/076242 A1), entitled "Apparatus for Simulated Driving of a Motor Vehicle" filed concurrently with the present application.

A chassis dynamometer typically includes pairs of rollers for rotatably supporting the drive wheels of a vehicle such that the vehicle remains stationary whilst a "driver" thereof operates the vehicle's controls to provide power to and thus rotate the drive wheels, thereby rotating the rollers from which various signals are derived allowing for fault diagnoses if the vehicle is being tested, or for the generation of virtual scenic imagery for driving simulations as disclosed in the applicant's above-mentioned concurrently filed International application No. PCT/AU2005/000131 (WO 2005/076242 A1).

To minimize risks to safety, a motor vehicle being tested or involved in a simulated driving session on a dynamometer apparatus should be secured in position relative to the dynamometer to prevent its drive wheels, as they are being driven under power, from inadvertently coming off the rollers with consequential loss of control of the vehicle. Typically a vehicle is restrained on the chassis dynamometer by the manual securement of a number of hold-down chains, bands, ropes or the like between the vehicle and the dynamometer. However this method of securement is slow and thereby inefficient because it lessens the available time for productive use of the dynamometer. For example, in the case of a dynamometer that is part of apparatus for simulated driving of a motor vehicle, particularly for simulated racing, as disclosed in the applicant's above-mentioned concurrently filed International application No. PCT/AU2005/000131 (WO 2005/076242 A1), it is desirable to have as high a throughput of vehicles through the racing simulation apparatus as possible to ensure that operation of the apparatus is commercially viable.

DISCLOSURE OF THE INVENTION

The present invention provides a securing mechanism for attachment to a chassis dynamometer for securing a motor vehicle on the dynamometer, the securing mechanism including a vehicle engaging component which, when the securing mechanism is attached to a dynamometer, is engageable with a vehicle on the dynamometer to thereby secure the vehicle to ensure it remains substantially stationary on the dynamometer, and at least one actuator for moving the vehicle engaging component into engagement With the vehicle for securing the vehicle wherein the actuator is for use with a remotely operable control system.

The securing mechanism, besides providing for safety by ensuring that the vehicle remains stationary during a test or simulated driving session, is such that it can be made remotely controllable (that is, it can have an operating location that is spaced apart from a dynamometer to which the securing mechanism may be attached) and this additionally provides an advantage that a vehicle can be very quickly secured once its drive wheel is on the rollers of the dynamometer and can also be very quickly released after the conclusion of a test or simulated driving session. This allows for the dynamometer that has the securing mechanism attached thereto to have a high throughput of vehicles, thereby increasing the profitability of use of the dynamometer compared to one in which a vehicle is manually secured using hold-down ropes, chains, bands or the like.

The securing mechanism may be such that it is for use with a control system that is principally an hydraulic, pneumatic or electrical system and thus the securing mechanism will include at least one correspondingly operable actuator, for example, respectively either an hydraulic ram, a pneumatic ram or an electric motor.

Preferably the actuator is one of a plurality of actuators of the securing mechanism and the plurality of actuators are operable to move the vehicle engaging component along at least two generally orthogonal axes for the vehicle engaging component to engage the vehicle. More preferably, the plurality of actuators are operable to move the vehicle engaging component along three generally orthogonal axes, wherein one axis extends transversely of a vehicle on the dynamometer, another axis extends generally longitudinally of the vehicle and the third axis extends generally normal to the dynamometer towards and away from the vehicle.

Preferably the actuators are pneumatically operable piston and cylinder type actuators.

The vehicle engaging component of the securing mechanism should engage a structural part of the vehicle that is directly associated with the drive wheel. For example, for a vehicle having driven rigid axle rear wheels, this structural part may be the rear axle housing, or if the driven wheels are independently suspended it may be at a location directly associated with the knuckle assembly of the wheel hub, for example a bracket thereon which mounts a suspension component such as a spring or shock absorber. The reason for the vehicle engaging component to engage a structural part that is directly associated with the drive wheel is to increase safety because if another part of the vehicle is engaged, the "holding down" of the drive wheel on the rollers of the dynamometer apparatus will be indirect, that is, the vehicle suspension will be interposed between the location where the vehicle engaging component of the securing mechanism engages the vehicle and the part of the vehicle which contacts the rollers, that is, the drive wheel. With such an indirect securement of the vehicle, wheel spin of the driven wheel on the rollers may occur and thereby adversely affect not only the stability of the securement of the vehicle but also the test or simulated driving session.

The vehicle engaging component of the securing mechanism may be such as to engage a vehicle without modification of the vehicle. For example, it may be in the shape of a hook for hooking onto an appropriate part of the vehicle. More usually, however, the vehicle engaging component will be such as to engage a specially provided part on the vehicle, for example a bracket which is fixed to an appropriate part of the vehicle. Such a bracket may be for example in the shape of a hook which is mounted to a rear axle housing (as will be described hereinbelow), in which case the vehicle engaging component may be a pin (as will also be described hereinbelow). Another possibility is for the vehicle engaging component to include a roller for engaging the inside of the rim of the drive wheel. This may require the drive wheel(s) of the vehicle to have specially provided rim(s).

Given that the dynamometer apparatus should ideally accommodate as wide a variety of vehicles as possible and to ensure the safe securement of all vehicles, it is preferred that any vehicle that is to use the apparatus have a special fitting such as a bracket or brackets fitted thereto beforehand which the vehicle engaging component of the securing mechanism engages. Such brackets will vary from vehicle type to vehicle type, but have a commonality in that the one form of vehicle engaging component is able to engage with them. Preferably the vehicle engaging component of the securing mechanism is a pin and any given bracket is such that it includes an aperture or opening for receiving the pin.

The invention also provides a bracket as such for fixation to a motor vehicle for the vehicle to be secured on a chassis dynamometer apparatus, the bracket including a portion for fixation to a structural part of the vehicle that is directly associated with a drive wheel of the vehicle and another portion having an opening or aperture into or through which a vehicle engaging component of a securing mechanism of the apparatus is movable for the vehicle engaging component to engage the bracket and thereby the vehicle for securing the vehicle.

The invention also provides apparatus for testing or simulated driving of a motor vehicle, the apparatus including a chassis dynamometer having a securing mechanism as described above attached thereto for securing a motor vehicle on the dynamometer.

Ideally the securing mechanism as attached to the chassis dynamometer will have a plurality of actuators that are operable to move the vehicle engaging component along at least two and preferably along three generally orthogonal axes, wherein one axis extends transversely of a vehicle while on the dynamometer, another axis extends generally longitudinally of the vehicle and the third axis extends generally normal to the dynamometer towards and away from the vehicle.

Preferably a control system is included for operating the actuators of the securing mechanism, the control system having an operating location that is spaced apart from (that is, is remote from) the chassis dynamometer. The control system, as is described above, may be principally an hydraulic, pneumatic or electrical system and thus the securing mechanism will include at least one correspondingly operable actuator, for example, respectively either an hydraulic ram, a pneumatic ram or an electric motor. Typically the control system may include electrical components, for example, position switches for manipulation by the operator, with either pneumatic or hydraulic components. Preferably the control system is principally a pneumatic system and the vehicle securing mechanism includes at least one pneumatically operable actuator for moving the component for engaging the vehicle.

Preferably a video monitoring system is also included for viewing the securing mechanism and providing a visual display thereof at the remote operating location of the control system for a human operator to monitor the movement of the vehicle engaging component of the securing mechanism whilst operating the control system.

For a better understanding of the invention and to show how it may be carried into effect, preferred embodiments thereof will now be described, by way of non-limiting example, with reference to the accompanying drawings.

BRIEF DESCRIPTION OF DRAWINGS

FIG. 4 is a perspective view showing components of a securing mechanism in accordance with an embodiment of the invention for a vehicle in driving simulation apparatus as in FIG. 1.

FIG. 5 is an end view of the securing mechanism components of FIG. 4 showing their attachment and association with parts of the driving simulation apparatus of FIG. 1 and a vehicle secured thereon.

DESCRIPTION OF PREFERRED EMBODIMENT

Figure 1:
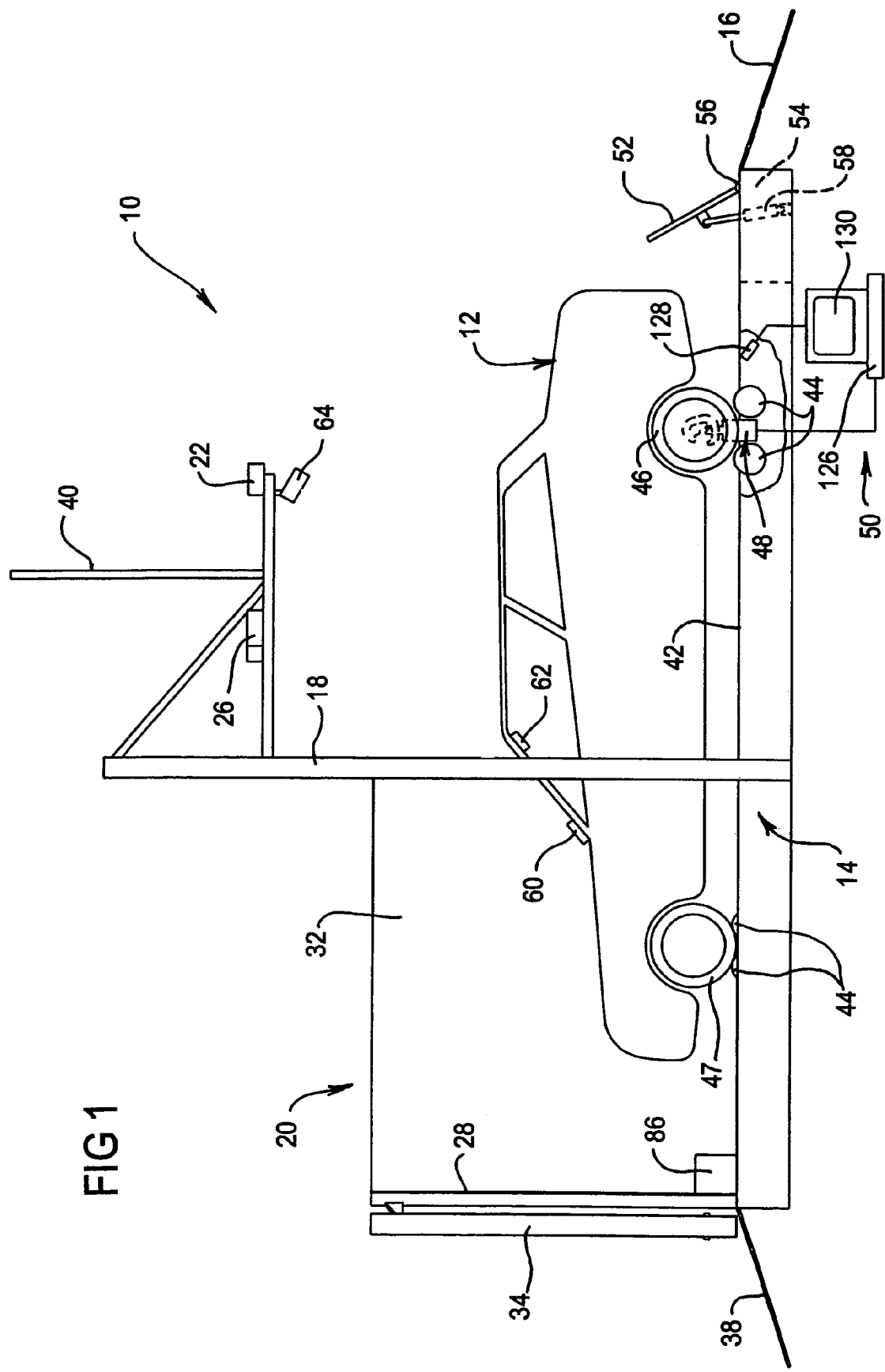
FIG. 1 is a schematic side elevation of apparatus for simulated driving of a motor vehicle that illustrates use of a securing mechanism according to an embodiment of the present invention.

FIG. 1 shows apparatus 10 for simulated driving of a motor car 12 whilst the car 12 remains stationary as comprising a chassis dynamometer 14 onto which the car 12 may be driven via an entry ramp 16 of the dynamometer 14. The chassis dynamometer 14 has a frame 18 associated therewith which carries other components of the apparatus 10. These other components include some portions of a viewing screen arrangement 20 and projectors 22, 24, 26 of a visual display system. The viewing screen arrangement 20 includes a front screen portion 28 that extends across the front of the motor car 12 and side screen portions 30, 32 that extend, respectively, a distance along each side of the motor car 12 (the side screen portion 30 has been omitted from FIG. 1 for clarity). Each side screen portion 30 and 32 is angled at 120° from the front screen portion 28. There are three projectors 22, 24, 26 of the visual display system mounted on the frame 18, each for projecting virtual scenic imagery onto a respective screen portion, that is projector 22 projects images onto opposite front screen portion 28, projector 24 projects onto opposite side screen portion 32 and projector 26 (which is hidden in the FIG. 2 view) projects onto opposite side screen portion 30. The projectors 22, 24, 26 may be Panasonic DLP (TM) Based Projectors No. PT-DS500E, which are provided with high quality wide-angle lenses for projecting onto the respective screen portions 28, 30 and 32.

The front screen portion 28 is mounted relative to two side structural poles 34 via actuators 36 (for example, pneumatic or hydraulic piston and cylinder rams) which are operative to raise the front screen portion 28 relative to the side screen portions 30 and 32 such that a car 12 and its driver, after having participated in a simulated driving session, can exit the apparatus 10 via an exit ramp 38 of the chassis dynamometer 14. The front screen portion 28 and actuators 36 are associated with the structural poles 34 such that the front screen portion 28, when it is to be raised, is first moved slightly away (for example, by a few mm only) from the adjacent edges of the side screen portions 30 and 32 such that as it is raised by the actuators 36, there is clearance between it and the adjacent edges of the side screen portions 30 and 32.

For apparatus 10 for simulated racing, the frame 18 may also have mounted thereon another, larger, visual display screen 40 for an audience to view the simulated race.

The chassis dynamometer 14 has a platform 42 and includes supports in the form of pairs of rollers 44 for supporting and rotatably engaging the rear wheels 46 and front wheels 47 of the car 12 as is known for chassis dynamometers. The rear wheels 46 of car 12 are the driven wheels and the front wheels 47 are the steered wheels. Thus the rollers 44 provide for the car 12 to remain stationery whilst a driver thereof manipulates the car's controls, for example the gear change (if not automatic) and accelerator, to rotate the drive wheels 46 of the car 12 at speed (the apparatus 10 could be set-up for the drive wheels of a vehicle to be either the front or rear or both the front and rear pairs of the wheels). Rotation of the drive wheels 46 correspondingly rotates the associated pairs of rollers 44 via which various performance parameters of the car 12, such as acceleration, speed (RPM), horsepower, torque and time to travel over a set distance, can be measured. Measurement of such performance parameters may include varying the loads that are applied to the wheels 46 of the car 12 via the pairs of rollers 44, as is known for chassis dynamometers. Suitable chassis dynamometers, which are adjustable to accommodate different vehicles having different wheelbases (which adjustability is not illustrated in the figures) are obtainable from DYNA DYNAMICS of Industry Court, Lilydale, Victoria 3140, Australia.

The chassis dynamometer 14 also includes a securing mechanism 48 according to an embodiment of the present invention (which is only schematically illustrated in FIG. 1 and is located between each of the rollers of the rear pairs of rollers 44) for securing the car 12 to the dynamometer 12 once the car 12 is positioned on the pairs of rollers 44. Securing mechanism 48 and its operation will be described in more detail hereinbelow with reference to FIGS. 4 and 5, however in broad terms it is associated with a remotely operable control system (schematically represented by reference 50 in FIG. 1) and adjustable thereby to allow it to secure in place on the rollers 44 various different types and sizes of vehicles. It includes componentry for engaging a vehicle, such as a car 12, to hold the vehicle in place. The securing mechanism 48 is a safety feature that ensures the car 12 remains stationary whilst its wheels 46 are driven at speed on the rollers 44.

The chassis dynamometer 14 furthermore includes an arrangement for diverting exhaust gases from the car 12 away from the immediate vicinity of the apparatus 10. This arrangement comprises a deflector plate 52 for deflecting exhaust gases from the car 12 into an extraction duct 54. The duct 54 may include an extraction fan or other means (not shown in FIG. 1) for drawing the exhaust gases into the duct 54. The deflector plate 52 is hinged to the platform 42 of the dynamometer 14 at 56 and provides a cover for the duct 54 when the apparatus 10 is not in use. Deflector plate 52 is pivotal about its hinge 56 via an actuator 58 (which may be for example pneumatic or hydraulic) which is pivotally attached between the deflector plate 52 and the dynamometer 14.

A car 12 which is to be used for driving instruction or to participate in a simulated drag or circuit race may include a remotely readable device, such as a bar code 60 and/or an electronic device 62, for example a "smart card" or other electronic tag-like device, which contains data about the car 12, the purpose and functioning of which will be described in more detail hereinbelow. A reader/transmitter 64 is mounted on frame 18 (near projector 22) for operation/co-operation with bar code 60 and/or electronic device 62.

Figure 3:
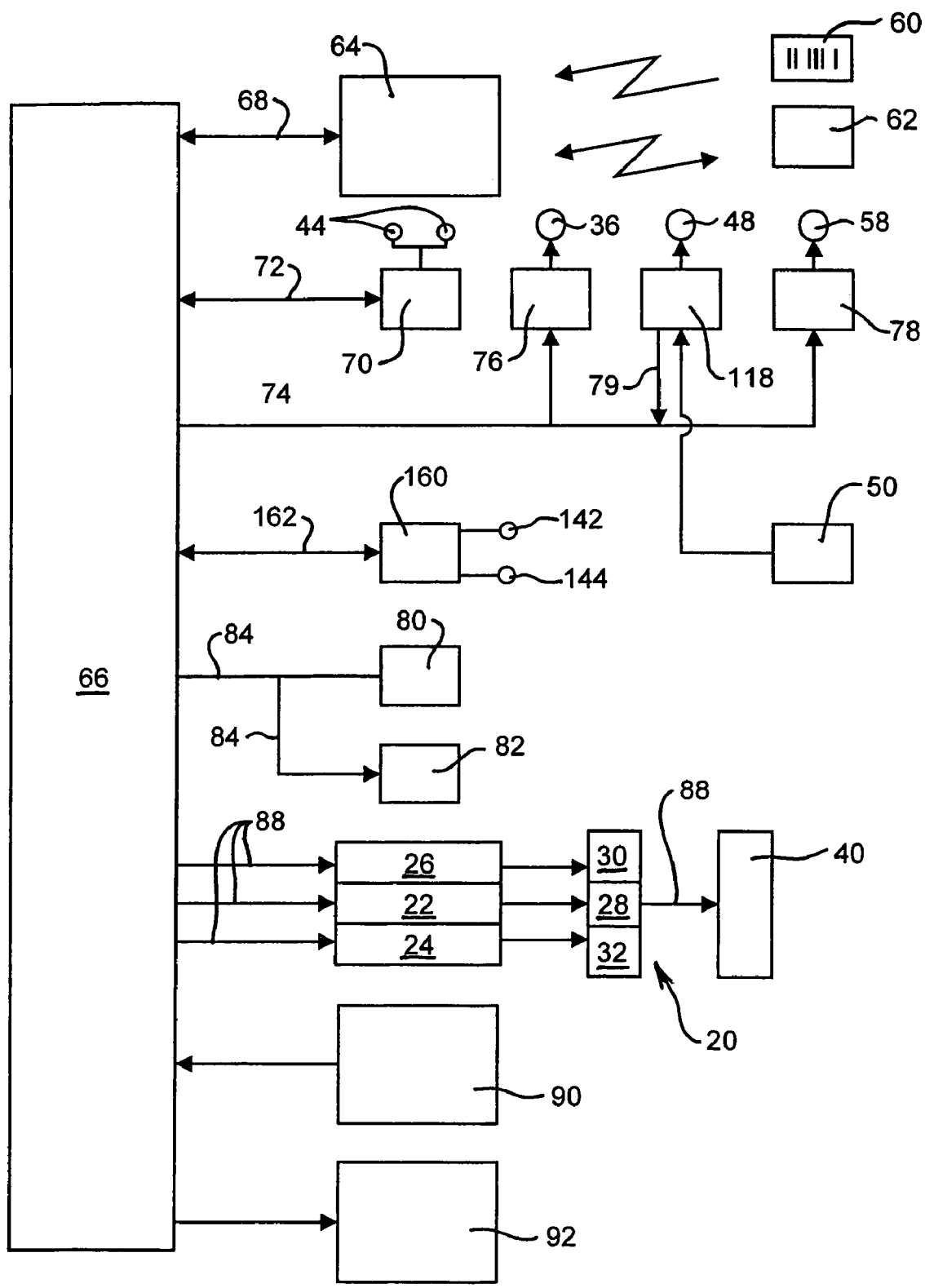
FIG. 3 is a block diagram showing operable associations of control and display components of apparatus as in FIGS. 1 and 2.

With reference to FIG. 3, the apparatus 10 for simulated driving includes a computer 66 which controls the various components of the apparatus 10 and contains the driving simulation software. The reader 64 (which may be combined with a transmitter) for reading the remotely readable bar code device 60 and/or electronic device 62 included in or on the car 12 is connected to computer 66 via a data link 68. Relevant data about car 12 is acquired by reader 64 from bar code 60 or electronic device 62 and inputted to the computer 66 over data link 68. A transmitter is preferably combined with the reader 64 for transmitting data from the computer 66 to the device 62 to update information about the car 12 that is stored by the electronic device 62. Such transmitted information may be, for example, data of the car's performance in a simulated ¼ mile drag race.

Each pair of rollers 44 of the chassis dynamometer 14 is associated with a brake unit 70 (also known as a "retarder"—only one of which is illustrated in the FIG. 3 schematic) and brake units 70 are operatively connected to computer 66 as indicated by data link 72 (as is known, an analogue to digital interface would be associated with each brake unit 70). There is data flow from computer 66 to brake units 70 to vary loads applied to the drive wheels 46 of a car 12 via the pairs of rollers 44 and also data feed back from the brake units 70 to the computer 66 from which relevant performance parameters of the car 12 are derivable, as is known for chassis dynamometers. The computer 66 also controls operation of the actuators 36 for raising the front screen portion 28 and the actuator 58 for deflector plate 52. Thus a signal line 74 from computer 66 is connected to respective converter/drivers 76 and 78 for operating respectively, the rams 36 for raising the front screen portion 28, and the actuator 58 for the deflector plate 52. The securing mechanism 48, which includes at least one actuator 118, is operated by the remotely operable control system 50. Note that reference 118 in FIG. 3 only schematically represents the actuator requirements for securing mechanism 48 in that multiple actuators may be involved to provide a range of movements, for example along three orthogonal axes, for the securing mechanism 48. A safety interlock signal over line 79 from mechanism 48–76 may be connected to computer 66 (for example via signal line 74) to prevent operation of the dynamometer 14 until the vehicle 12 has been secured thereon. Additionally, computer 66 controls the on-off operation of a blower fan 80 and an exhaust gas extraction fan 82 in duct 54 via a signal line 84. Blower fan 80 (not illustrated in the other figures) is provided to provide a cooling air flow to the front of the car 12 through apertures 86 in side screen portions 30 and 32 (see, for example, FIGS. 1 and 2).

Computer 66 also operates the three projectors 22, 24, 26 of the visual display system for viewing screen arrangement 20 and, if provided, screen 40, as indicated by data links 88.

The computer 66 will also typically include a data entry facility, such as a key board or touch screen 90 and an output device such as a printer 92.

Figure 2:
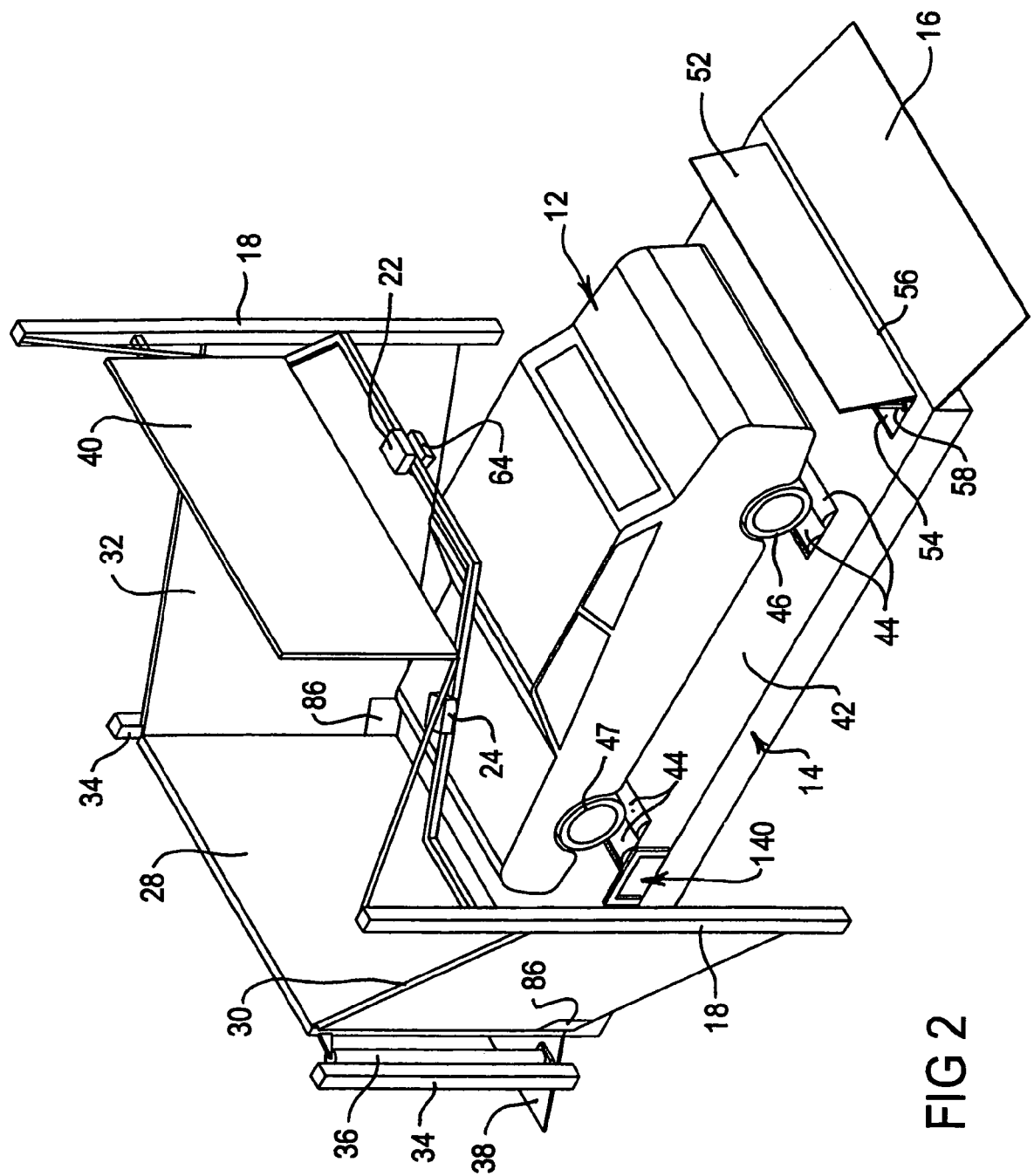
FIG. 2 is a schematic isometric view of the apparatus of FIG. 1 that includes a motor car.

The apparatus 10 also preferably includes a steering sensing arrangement 140 that includes a pair of transducers 142, 144, for measuring steering actions of a driver of a motor vehicle on the apparatus 10. The steering sensing arrangement 140 is preferably located on the dynamometer 14 adjacent a steered wheel 47 of the motor car 12, for example in FIG. 2 it is shown adjacent the left front wheel 47 of the motor car 12 (note that the steering sensing arrangement 140 is shown in FIGS. 2, and 3, but omitted from FIG. 1, for clarity).

FIG. 3 illustrates the connection of the transducers 142, 144 and electronic processing circuitry 160 to the computer 66. The signal on line 162 of steering movements is utilized by the simulation software to deflect the virtual scenic imagery on viewing screen arrangement 20 (that is, the imagery on all of screen portions 28, 30 and 32) in synchronism with the steering movements of the driver thereby increasing the realism of the "surrounding" virtual reality environment.

For apparatus 10 that includes a steering sensing arrangement 140, it is preferred that the steerable wheels 47 not be supported on the rollers 44 because this detracts from the "natural feel" of the steering. Thus a platform or swivel plate (not shown) may be placed over the rollers 44 on which the steerable wheels 47 would otherwise rest to provide a flat surface for the steerable wheels 47. Otherwise a chassis dynamometer 14 that provides rollers 44 only for the rear driven wheels 46 of a front wheel steering motor vehicle may be used.

The securing mechanism 48 and its operation will now be described with reference to FIGS. 4 and 5. FIGS. 4 and 5 illustrate only half of the mechanism 48 for securing the car 12 via its rear axle housing 94 adjacent its left side rear wheel 46 (for clarity, FIG. 4 omits the car's rear wheel 46 and the pair of rollers 44 on which the wheel 46 rests). A similar arrangement to that which is illustrated is also provided for the other side of the car 12. The mechanism 48 requires brackets, such as hooks 96 (only one of which is illustrated) to be permanently attached, for example by welding, to the rear axle housing 94 of the car 12. The hooks 96 are open towards the front of car 12 for safety. The securing mechanism 48 includes a load beam 98 having a pivot 100 located at each end (only one of which is shown) via which the load beam 98 is pivotally attached to opposite structural side beams 102 of the dynamometer 14. (FIG. 5 shows only one side beam 102). A curved bracket arm 104 is attached to load beam 98 near its centre and an actuator 106 (for example a pneumatic or hydraulic piston/cylinder ram) is pivotally attached to the bracket arm 104 and to the chassis dynamometer 14 for pivoting the load beam 98 (bracket arm 104 and actuator 106 have been omitted from FIG. 5 for clarity). Arrow B on FIG. 8 indicates the pivotal movement of the load beam 98 via actuation of actuator 106. The pairs of rollers 44 of the dynamometer have respective axles 108 which are mounted in bearings 110, which bearings 110 are mounted on respective structural side beams 102. Not shown is the mounting of axles 108 extending from the other side of each roller 44 in bearings such as 110 mounted to structural beams of the dynamometer located between the side beams 102. The load beam 98 is pivotally attached to side beams 104 such that it is located between and below a pair of rollers 44. The load beam 98 spans the width of the dynamometer 14 between its side beams 102.

The top of the load beam 98 includes a slideway 112 which captively holds a block 114 for sliding movement along the load beam 98. The block 114 is connected to an actuator 116 (for example a pneumatic or hydraulic piston and cylinder ram) which is attached to the load beam 98 adjacent to pivot 100 and which is operable to move the block 114 to and fro along load beam 98 as indicated by arrow C. Block 114 carries another actuator 118 (for example a pneumatic or hydraulic piston and cylinder ram) which is moveable upwardly and downwardly relative to block 114 as indicated by arrow D. Block 114 includes guide rods 120 for guiding and providing lateral stability for actuator 118. For clarity, the means for actuating the actuators 116 and 118 (for example pneumatic or hydraulic hose connections from a suitable supply which are components of the remotely operable control system 50) have been omitted from FIGS. 4 and 5, and likewise for the actuators 36 and 58 of FIGS. 1 and 2.

Attached to the top of the actuator 118 in a mounting 122 is a pin 124 which extends generally horizontally beyond the actuator 118. Also, another actuator 116, block 114, actuator 118 and pin 124 arrangement (not shown) is located on load beam 98 adjacent its other end.

The securing mechanism 48 (comprising a vehicle engaging component, namely pin 124, and actuators 106, 116 and 118 together with load beam 98—as represented by reference 118 on FIG. 3) is remotely operable by a control system 50 (schematically represented by reference 50 on FIGS. 1 and 3 but not shown on the other Figs). The control system 50 comprises operating switches in an operator's console or booth 126 (schematically shown only in FIG. 1) located for example beside the chassis dynamometer 14 for controlling the operation of the actuators 106, 116 and 118. The control switches may be "joystick" type switches for operating a pneumatic system for powering the actuators 106, 116, 118. A "joystick" type switch may be provided for operating respectively each actuator of each side of the securing mechanism 48. The dynamometer 14 also includes a video monitoring system (schematically illustrated only in FIG. 1) comprising video cameras 128 located to view the operation of the vehicle securing mechanism 48 and display the movement of at least pins 124 and possibly also actuators 106, 116, 118 on a video screen 130 located in the operator's console or booth 126 for an operator to view such movement as she/he operates the switches of the control system 50 to move the pins 124 as desired.

By appropriate operation of actuators 106, 116 and 118 via the control system 50 in directions B, C and D, the pin 124 is positionable to engage in front of hook 96 as shown in FIG. 5 (and similarly for the opposite actuators on load-beam 98). Actuator 118 is furthermore operable via the control system to "pull down" on the hook 96 and thereby secure the car 12, via its rear axle housing 94, in position on the rollers 44 of dynamometer 14. The pivotal movement B of load beam 98 via operation of actuator 106 by the control system 50 accommodates for tolerances in the engagement positions of pins 124 with hooks 96 and for different motor vehicles. Different "pull down" forces may be applied by the actuators 118 to vary the loading of wheels 46 on the pairs of rollers 44. Skilled persons will understand that the securing mechanism 48 and hooks 96 must have adequate structural integrity to accommodate the loading and forces to which they will be subjected.

In a modification of the mechanism 48, the actuator 106 providing the controlled generally longitudinal movement B may be omitted and a pre-tensioned springs or other biasing means which generally centralises each pin 124 longitudinally between each roller of a pair of rollers 44 may be provided in its place. This does not compromise the utility of the mechanism 48 for engaging a motor car 12 and has the advantage of allowing some movement of the motor car 12 forwards and backwards on the rollers 44 as it is being "driven" thereon, which adds to the realism of a simulated driving session on the apparatus 10.

It is within the scope of the invention that an alternative securing mechanism may be provided which does not require attachment of brackets such as the hooks 96 to a vehicle, although it is considered that usually a vehicle which is to use the apparatus of the invention will have brackets fitted thereto for the pins 124 to engage. Thus, it is envisaged that a suitable hook arrangement may be associated with suitable actuators providing for the range of movements B, C and D such that the hook arrangement can be moved to hook onto an appropriate structural component of a vehicle, for example the rear axle housings as for the mechanism 48. As an example of such an alternative, the pins 124 of securing mechanism 48 of FIGS. 4 and 5 could be replaced with suitably shaped and orientated hooks to hook onto the rear axle housings 94, and although this may require some modifications of the actuator assemblies 106–116–114–118 to fit within the available space, such modifications may be made by a person who is mechanically skilled. In this alternative, the hooks would be orientated with their openings to the rear of the vehicle for safety, that is such that the "forwards" driving of the wheels 46 on rollers 44 would be in the opposite direction to the hook openings.

Operation of the apparatus 10 for simulated driving will now be described.

Prior to the car 12 being driven onto the chassis dynamometer 14, the racing simulator 10 will be set up such that the front screen portion 28 will be in its lowered position, the securing mechanism 48 will be in an inoperative position and the deflector plate 52 will be closed. Also the pairs of rollers 44 will be braked to effectively lock them to allow car 12 to be driven onto them. Plates (not shown) that can be raised or lowered by an operator may be located between each roller 44 of each pair of rollers 44. When such plates are in their raised position, a motor car 12 can be readily driven into position on the dynamometer 14 without having to go over the 'humps' of the rollers 44. When the car 12 is correctly positioned, the plates can be lowered to bring its wheels 46, 47 into contact with the rollers 44 for the car 12 to be supported thereon. As the car 12 approaches the chassis dynamometer 14, its bar code device 60 or drag tag 62 is read by reader 64 for computer 66 to initiate adjustment of the dynamometer 14 to space the pairs of rollers 44 to suit the wheelbase of the car 12. Once the car 12 has been driven onto the pairs of rollers 44, if the car 12 is authorized for a race in the racing simulator 10, the operator in console 126 operates the control system 50 for the mechanism 48 to secure the car 12 in position. An option for the securing mechanism 48 is to provide a facility (not shown) near the entry ramp 16 for a driver of the car 12 to pre-select the hold-down pressure that will be applied by the actuators 118 of the securing mechanism 48. The hold-down pressure may be between about 2 to 8 bar. This gives the driver the option of selecting a greater pressure to give better traction but at the expense of available horsepower, as opposed to less pressure for greater available horsepower but a higher likelihood of wheel spin on the rollers 44. The computer 66 is then further initiated to set up the racing simulator 10 for the car 12. This may be in accordance with data about the car 12 that has been acquired from a "drag-tag" 62 via the reader/transmitter 64. Thus the computer 66 transmits appropriate signals on signal line 74 for actuator 58 to raise the deflector plate 52. The brake unit(s) 70 may also be conditioned via a signal over line 72 to impose a certain load via roller pairs 44 to suit the car 12 for the race simulation. For example, a certain "rolling resistance" may be required. The racing simulator 10 is now conditioned or set up for the simulated drag race to begin.

Computer 66 includes simulation software, for example for a ¼ mile drag race, which is automatically initiated as soon as the racing simulator 10 is set up for the drag race to begin. This software via the visual display system displays a lighting sequence on front screen portion 28 for the driver to start, as is known for real ¼ mile drag racing. On receiving the final start light, the driver presses on the accelerator of car 12 as though commencing a real race and the virtual scenic imagery display on screen arrangement 20 progresses in dependence upon the speed of the wheels 46 via feedback from the pairs of rollers 44. The simulation software is such as to drive the computer's image generator and thus the projectors 22, 24, 26 to display on the viewing screen arrangement 20 realistic three-dimensional virtual front (on front screen portion 28) and side (on side screen portions 30 and 32) scenic imagery of front-on and passing scenery as though the driver was racing the car 12, which virtual scenic imagery has a progression that is synchronised to the speed of the drive wheels 46 of car 12 as measured via the pairs of rollers 46. Thus all speed changes via acceleration, gear changes and braking are sensed and fed to computer 66 to control the progress of the virtual scenic imagery. The driver of the car 12, with his/her eyes focussed on the front screen portion 28 of the viewing screen arrangement 20 (which may be quite large, for example each screen portion may be 4.5 m×3.375 m to render greater realism) experiences the sensation of participating in a real drag race in his/her own car 12 whilst the car 12 remains stationary and is secured in position on the chassis dynamometer 14 by securing mechanism 48.

Simultaneously with commencement of the simulated race, the computer 66 initiates operation of the blower fan 80, the outlets 86 for which are located for air to blow onto the front of the car 12 to cool its engine for the duration of the simulated race. The extraction fan 82 in the exhaust gas extraction duct 54 is also switched on at the same time as the blower fan 80 by the computer 66.

At the end of the simulated ¼ mile drag race the time taken for the driver/car 12 combination to complete the race is displayed on front screen portion 28 and transmitted by reader/transmitter 64 to the "drag-tag" 62 to be stored by the "drag-tag" 62. Thus a "drag-tag" 62 can store data of a race number and the time for that race such that the driver can have a history of his/her times over a series of simulated races displayed on the front screen portion 28 at the commencement and end of a simulated drag race.

After a short display of the driver/car 12 race time on front screen portion 28, the operator operates the control system 50 to release the securing mechanism 48, and the computer 66 initiates closure of the deflector plate 52, raising of the front screen portion 28 and locking of the pairs of rollers 44 whereupon the driver is able to drive car 12 forwardly off the chassis dynamometer 14 over its exit ramp 38. The race simulator 10 is thus ready to receive another vehicle via its entry ramp 16.

The apparatus 10 may also be used for simulated circuit races and this will differ from the above description about simulated drag racing in that additionally the steering sensing arrangement 140 is operated to input the drivers steering actions during a simulated circuit race into the computer 66 for the simulation software to drive the computer's image generator and thus the projectors 22, 24, 26 to laterally deflect the virtual scenic imagery on the viewing screen arrangement 20 in synchronism with the steering actions of the driver. That is, the virtual scenic imagery progresses in real time in synchronism with both the power applied by the driver to the drive wheels 46 and with the driver's steering actions.

For the apparatus 10 to be used for circuit racing, the steered wheels 47 of the car 12 are preferably not supported by the rollers 44, instead they may be supported on a support plate between or over the rollers 44 (as mentioned above). Alternatively the dynamometer 14 may be of a type that includes rollers 44 for supporting only the drive wheels 46 of a car 12 and not its steered wheels 47.

The apparatus 10 may be used for driver training instead of circuit racing (in which case the simulation software need not provide the start procedures for drag or circuit racing as described above). Apparatus 10 may also be provided for driver training which already has a car 12 secured in position on the dynamometer 14, thus eliminating the need for a learner driver to have his/her own vehicle and rendering unnecessary the use of a bar code device 60 or 'drag-tag' 62. Generally, apparatus 10 that is for driver training will be set up to accommodate rear wheel drive vehicles with front wheel steering.

The dynamometer may include less than the four pairs of rollers 44, for example it may include only two pairs of rollers to rotatably support the drive wheels of a vehicle, be they the front or rear pair of wheels. It is also within the scope of the invention to provide a race simulator for two wheeled vehicles such as motorcycles, in which case the dynamometer component may comprise a support platform that includes rollers for the front or rear wheel or both wheels of the motorcycle, or a rotatable platform type of movable support for both wheels.

A securing mechanism as such, according to the invention, may be separately supplied for attachment to a chassis dynamometer, whether the dynamometer is part of apparatus for simulated driving as described above, or a stand alone chassis dynamometer for testing motor vehicles.

The invention described herein is susceptible to variations, modifications and/or additions other than those specifically described above and it is to be understood that the invention includes all such variations, modifications and/or additions which fall within the scope of the following claims.

The invention claimed is:

1. A securing mechanism for attachment to a chassis dynamometer for securing a motor vehicle on the chassis dynamometer, the securing mechanism comprising:
   a vehicle engaging component which, when the securing mechanism is attached to a chassis dynamometer, is engageable with a structural part of the vehicle on the dynamometer to thereby secure the vehicle to ensure it remains substantially stationary on the dynamometer, wherein the structural part of the vehicle is directly associated with a drive wheel of the vehicle whereby the vehicle is securable on the chassis dynamometer such that a resilient suspension of the vehicle is not interposed between the drive wheel and the vehicle engaging component; and
   at least one actuator for moving the vehicle engaging component into engagement with the vehicle for securing the vehicle wherein the actuator is for use with a remotely operable control system.

2. A securing mechanism as claimed in claim 1 wherein the actuator is one of a plurality of actuators of the mechanism and wherein the plurality of actuators are operable to move the vehicle engaging component along at least two generally orthogonal axes for it to engage the vehicle.

3. A securing mechanism as claimed in claim 2 wherein the plurality of actuators are operable to move the vehicle engaging component along three generally orthogonal axes, wherein one axis extends transversely of a vehicle on the chassis dynamometer, another axis extends generally longitudinally of the vehicle and the third axis extends generally normal to the chassis dynamometer towards and away from the vehicle.

4. A securing mechanism as claimed in any one of claims 1 to 3 wherein the actuators are pneumatically operable piston and cylinder actuators.

5. A securing mechanism as claimed in claim 1 wherein the vehicle engaging component includes a portion in the shape of a hook for hooking onto a structural part of a vehicle.

6. A securing mechanism as claimed in claim 1 wherein the vehicle engaging component includes a portion that has a shape for engaging a complementary shaped bracket that is fixed to the vehicle.

7. A securing mechanism as claimed in claim 6 wherein the vehicle engaging component is a pin for engaging said bracket that includes an aperture or recess for receiving the pin.

8. Apparatus for testing or simulated driving of a motor vehicle, the apparatus including a chassis dynamometer having a securing mechanism as claimed in claim 1 attached thereto for securing a motor vehicle on the chassis dynamometer.

9. Apparatus as claimed in claim 8 wherein the chassis dynamometer includes a pair of rollers for rotatably supporting a drive wheel of a motor vehicle and wherein the securing mechanism is attached to the chassis dynamometer between the two rollers of the pair of rollers for the vehicle engaging component of the securing mechanism to engage an axle housing of the drive wheel of the motor vehicle or a bracket that is fixed to the axle housing.

10. Apparatus as claimed in claim 9 wherein the securing mechanism includes a load beam that extends between opposite side beams of the chassis dynamometer and is pivotally attached to the side beams, and including means which is operable to pivot the load beam whereby the vehicle engaging component is moveable along said axis that extends generally longitudinally of a motor vehicle on the chassis dynamometer.

11. Apparatus as claimed in claim 10 wherein the load beam includes a slideway and a block is captively mounted to the load beam for sliding movement along the slideway, and an actuator of said plurality of actuators is operable to slide the block along the slideway whereby the vehicle engaging component is moveable along said axis that extends transversely of a motor vehicle on the chassis dynamometer.

12. Apparatus as claimed in claim 11 wherein a further actuator of said plurality of actuators is mounted on said block and the vehicle engaging component is mounted on said further actuator, whereby the further actuator is operable to move the vehicle engaging component along said axis that extends generally normal to the chassis dynamometer towards and away from a motor vehicle on the chassis dynamometer.

13. Apparatus as claimed in claim 8 including a control system for operating the actuators of the securing mechanism, the control system having an operating location that is spaced from the chassis dynamometer.

14. Apparatus as claimed in claim 13 wherein the control system provides for pneumatic operation of each of the plurality of actuators.

15. Apparatus as claimed in claim 13 further including a video monitoring system for viewing the securing mechanism and providing a visual display thereof at the operating location of the control system for a human operator to monitor the movement of the vehicle engaging component of the securing mechanism whilst operating the control system.

16. A bracket for fixation to a motor vehicle for the motor vehicle to be secured on a chassis dynamometer of apparatus as claimed in claim 8 the bracket including a portion for fixation to a structural part of the motor vehicle that is directly associated with a drive wheel of the motor vehicle, and another portion having an opening or aperture into or through which the vehicle engaging component of the securing mechanism of the apparatus of claim 8 is moveable for the vehicle engaging component to engage the bracket and thereby the vehicle for securing the vehicle.

17. A bracket as claimed in claim 16 wherein the portion having an opening or aperture is shaped as a hook.

18. A bracket as claimed in claim 17 wherein the portion for fixation to a structural part of the motor vehicle is shaped such that when the bracket is fixed to that structural part, the hook shaped portion will be open towards the front of the motor vehicle.

* * * * *